United States Patent Office 3,166,716
Patented Jan. 19, 1965

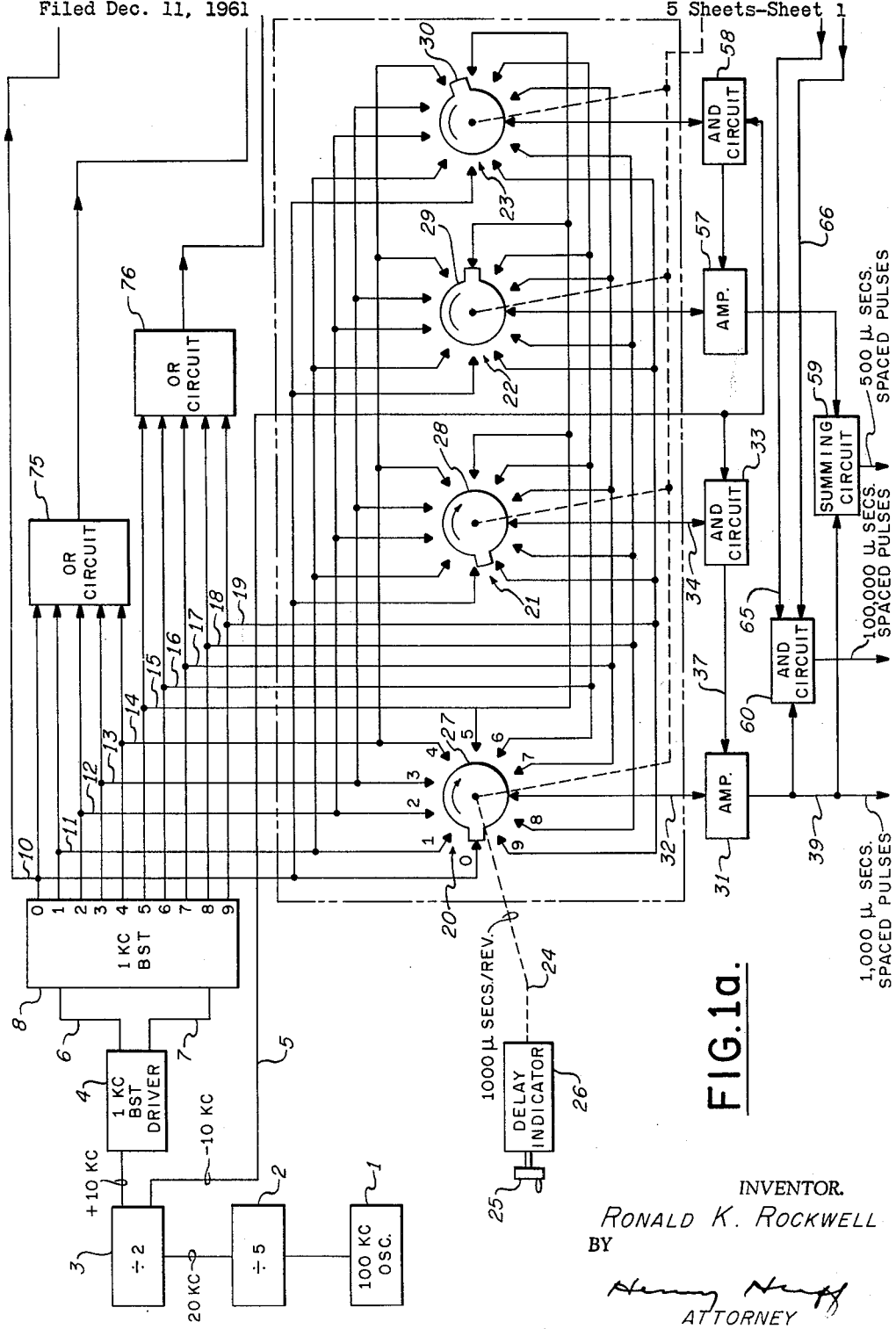

3,166,716
GENERATOR SYSTEM PRODUCING POSITIONABLE OUTPUT PULSES, EMPLOYING BEAM SWITCHING TUBES AND GANGED ROTATABLE SWITCHES
Ronald K. Rockwell, Old Bethpage, N.Y., assignor to Sperry Rand Corporation, Great Neck, N.Y., a corporation of Delaware
Filed Dec. 11, 1961, Ser. No. 158,333
12 Claims. (Cl. 328—64)

The present invention generally relates to devices for producing controllably delayed pulses and, more particularly, to a generator for producing a pulse which may be controllably delayed to occur at any one of a very large number of precise time increments within an extended time interval.

Delayed pulse generators are widely employed in the electronic time measurements art. Such generators are utilized, for example, in loran receivers as timing standards for accurately determining the time difference between the receptions of pulse transmissions issuing from a plurality of predetermined locations. The time difference measurement, as is well known, establishes the location of the receiver relative to the known transmitter sites.

Conventional loran systems operate at carrier frequencies of about 2 megacycles per second to afford ground wave navigational signal coverage over a service area having a radius of approximately 600 to 700 nautical miles as measured from the transmitter locations. Due to the relatively restricted service area of conventional loran systems and the pulse delay transmitter identification coding used, the time interval between the receptions of the transmitter pulses at the loran receivers ordinarily is no greater than about 20,000 microseconds.

More recently, extended range loran navigational systems of improved accuracy have been placed into operation. The extended range systems operate at low carrier frequencies of about 100 kilocycles per second and are used to determine receiver positions (relative to the locations of the transmitters) at ranges up to about 1,200 nautical miles as compared to the aforementioned 600 to 700 nautical mile coverage of the higher frequency conventional loran system.

The substantially enlarged areas serviced by the extended range loran systems and the elimination of the pulse delay coding for transmitter identification have increased the maximum time difference between the receptions of the transmitter pulses at the receiver to approximately 100,000 microseconds in contrast to the maximum time difference of about 20,000 microseconds encountered in the earlier loran systems.

The five fold increase in the maximum time difference measurement interval has created the need for receiver timing pulse generators capable of producing pulses which may be controllably delayed and precisely positioned at any one of a very large number of time increments within a total time interval of, for example, 100,000 microseconds. It is important, of course, that the increased delay and the pulse positioning accuracy requirements be met without resort to extrapolations of prior art techniques which would engender undue circuit complications and reduce system reliability.

One object of the present invention is to provide a generator for producing a controllably delayed output pulse which may be accurately positioned at any one of a very large number of time increments within an extended total time interval.

Another object is to provide a pulse generator for producing an output pulse whose time position may be changed in precisely controlled incremental amounts.

An additional object is to provide a delayed pulse generator responsive to input signals derived from a cascaded series of beam switching tubes.

A further object is to provide a generator for producing a series of pulsed signals having leading edges occurring at accurate determinable times.

These and other objects of the present invention, as will appear from the following specification, are accomplished in a preferred embodiment by the provision of a cascaded series of pulse counting devices, a ganged plurality of multiple-position rotary switches and a network of logical decision circuits which coact to produce an output pulse occurring at a time determined in accordance with the position of the ganged rotary switches. In accordance with the preferred embodiment, each of the pulse counting devices consists of a decade beam switching tube having 10 output terminals which are energized in sequence at a rate determined by the frequency of an applied driving signal. The driving signal for each successive beam switching tube is derived from a predetermined output terminal of its respective preceding beam switching tube. The first tube of the cascaded chain of beam switching tubes is driven by a timing oscillator. Each of the cascaded tubes divides the frequency of its respective input signal by a factor of 10.

A pair of ganged rotary decade switches is provided for each of the beam switching tubes. Each switch pair is connected to the output terminals of a respective beam switching tube. Each switch connects one of said output terminals to a logical decision circuit in accordance with the angular displacement or setting of the switch. The circuit associated with a succeeding beam switching tube also receives signals derived from specially combined outputs of the respective preceding beam switching tube. Each logical decision circuit produces a series of output pulses having leading edges occurring at times accurately controlled in accordance with the angular displacement of the associated rotary switch. The outputs of the decision circuits then are combined to produce a single pulse which may be accurately delayed within an extended time interval in accordance with the angular displacement of all the ganged rotary switches.

For more complete understanding of the present invention reference should be had to the following specification and to the appended figures of which:

FIGS. 1a and 1b together comprise a schematic diagram of a preferred embodiment of the present invention;

Figure 1B:
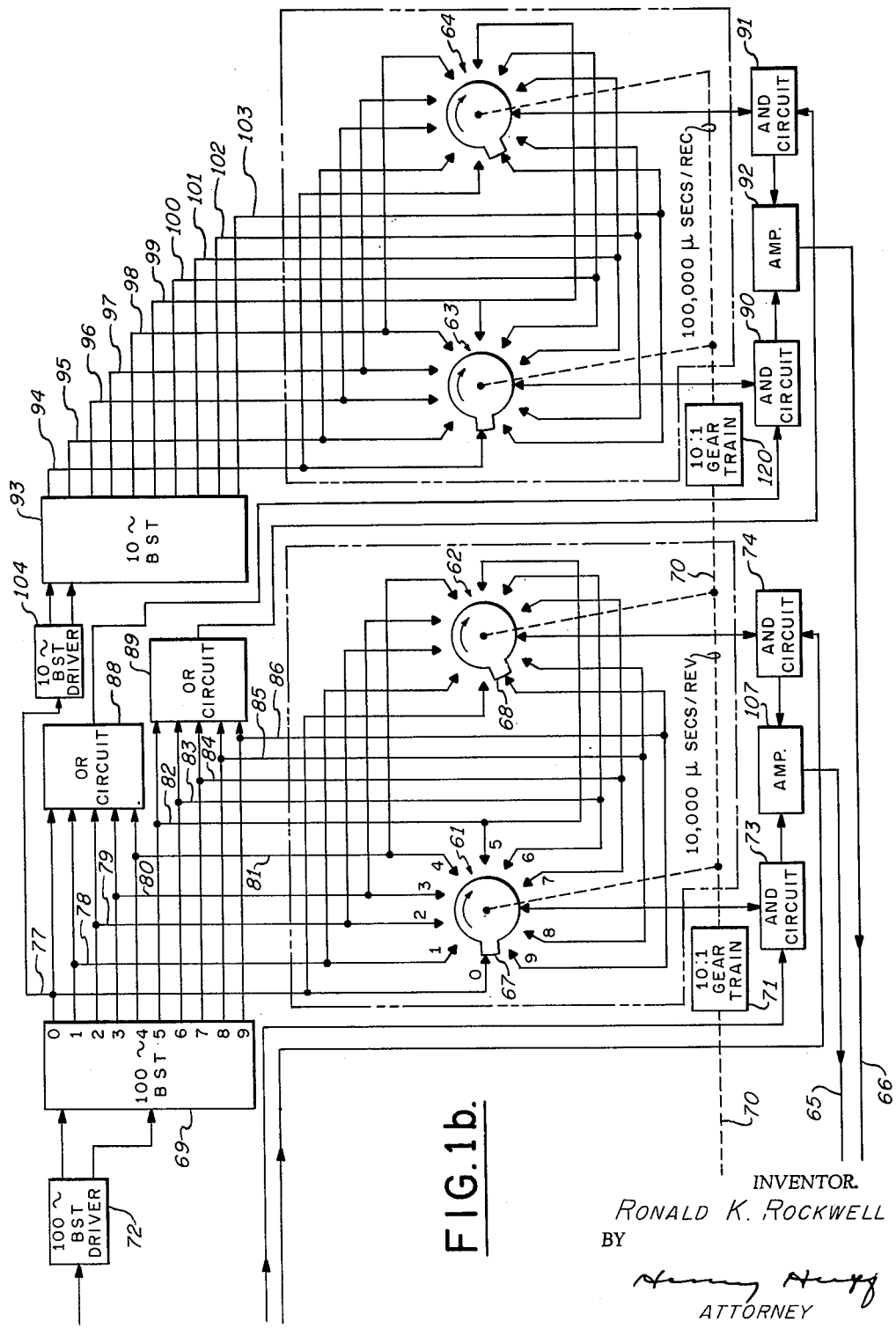

Referring to FIG. 1a, the reference numeral 1 generally represents a source of timing pulses having the illustrative repetition rate of 100 kilocycles per second. The pulses produced by oscillator 1 are applied to cascaded conventional pulse counting stages 2 and 3 which divide the repetition rate of oscillator 1 by factors of 5 and 2 respectively. Pulse counting stage 3 may comprise a conventional bistable multivibrator which produces a pair of output square waves in phase opposition with respect to each other and having a repetition rate of 10 kilocycles per second. The phases of the output square waves are arbitrarily designated + and —, respectively, the +10 kc. wave being applied to beam switching tube driver 4 and the —10 kc. wave being applied to line 5.

Driver 4 also may comprise a conventional bistable multivibrator to produce a pair of oppositely phased output square waves on lines 6 and 7, respectively, at the frequency of 5 kilocycles per second. The oppositely phased waves of lines 6 and 7 are applied to beam switching tube 8 in a conventional manner to advance the beam from one to the next succeeding one of the ten output terminals 0 to 9, inclusive. As is well understood, a beam switching tube includes a cathode and 10 groups of electrodes, one for each beam position. Each electrode group consists of a switching grid, a spade (which forms and locks the beam, and a target (which is a low impedance, current output electrode). To clear the tube, a positive pulse may be applied to the cathode. To form the beam from cut-off, a negative pulse must be applied to the spade electrode on which beam formation is desired.

The beam may be advanced from one output electrode to the next by applying a negative pulse to the grid associated with the following (next) spade. Conveniently the grids are tied together into two sets, one set being the grids associated with the odd spades, the other set being the grids associated with the even spades. The pulsing of the even grids will advance the beam from an odd spade to the next succeeding even spade. The pulsing of the odd grids will advance the beam from an even spade to the next succeeding odd spade. Beam switching tube 8 is pulsed in this manner by applying the 5 kc. square wave on line 6 to the even set of grids and by applying the 5 kc. square wave on line 7 to the odd set of grids. Thus, in response to each of the 10 kc. pulses at the input of driver 4, the beam of tube 8 is advanced from its present position to the position of the next succeeding spade (output terminal).

It will be seen that each signal appearing at the output terminals 0–9 of tube 8 is 100 microseconds in duration. Ten such pulses are produced during each complete switching cycle for a total of 1,000 microseconds per switching cycle.

The 100 microsecond pulses sequentially appearing at output terminals 0–9 of tube 8 are applied via lines 10–19, inclusive, to the stationary contacts of rotary switches 20, 21, 22 and 23. The individual contacts are numbered in accordance with the number of the output terminal of tube 8 to which they are connected. Each of rotary switches 20–23 further includes a rotatable wiper member positioned in accordance with shaft 24. The angular displacement of shaft 24 is set by handwheel 25 and displayed by delay indicator 26. Each of the ganged rotatable members 27, 28, 29 and 30 are driven through the same angle by a given movement of shaft 24; however, members 29 and 30 are permanently "phased" so as to be substantially 180 degrees angularly displaced relative to members 27 and 28 respectively.

Indicator 26 is calibrated to display a numerical change of 1,000 microseconds for each complete revolution of shaft 24 and members 27–30. Accordingly, each of the stationary contacts of switches 20–23 is angularly displaced from the adjacent contacts by an amount proportional to 100 microseconds as displayed by indicator 26. The arcuate extent of each wiper blade is effectively ¾ of the displacement between the adjacent stationary contacts. That is, the arcuate extent is 75 microseconds of the 100 microseconds displacement between the adjacent stationary contacts. The wiper blade of member 28 is out of angular phase (alignment) with respect to member 27 by one half of one switch position (50 microseconds of shaft rotation). The wiper blade of member 30 is similarly out of phase with respect to the wiper blade of member 29.

Figure 2:
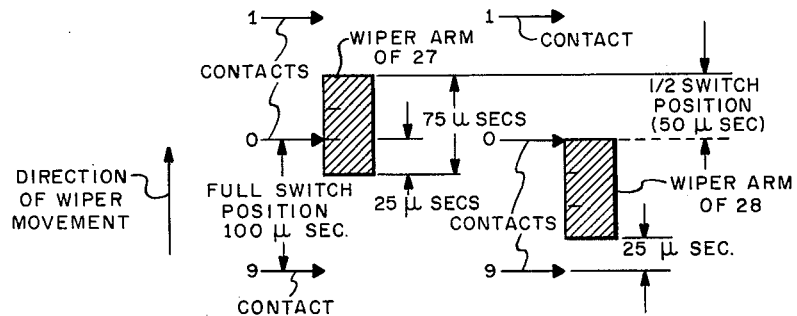
FIG. 2 is a schematic diagram depicting the pertinent dimensions of the rotary switches utilized in the preferred embodiment.

The above relationships between the stationary contacts and the rotatable wiper blades are shown more clearly in FIG. 2. By reference to FIG. 2, it will be seen that either wiper is disconnected from a stationary contact only during the middle third (25 microseconds of shaft rotation) of the other wiper's contact period. For example, as wiper 27 starts the last third of its "making" period with contact 0, wiper 28 closes with its same "0" numbered contact. Both wipers ride along these same numbered (0) contacts for 25 microseconds of additional angular shaft rotation until wiper 27 breaks contact with the contact 0. Inasmuch as the leading edge of the wiper 27 (75 microseconds wide) is still 25 microseconds from the next contact (1), wiper 28 alone makes contact for the next 25 additional microseconds rotation which comprise the middle 25 microseconds of its contact period.

As the wipers complete the last stated 25 microseconds of rotation, wiper 27 closes the distance to the next contact (1) and both wipers 27 and 28 make contact simultaneously for the following 25 microseconds of rotation. It should be noted, however, that wiper 27 is now contacting contact 1 whereas wiper 28 is still contacting contact 0. At the end of this time, wiper 28 completes the final third of its contact period with contact 0 and becomes disconnected from contact 0. During the next 25 microseconds of rotation, only wiper 27 makes contact. At the end of this 25 microseconds, the cycle of "make" and "break" just described repeats with wiper 28 making contact with the next successive contact (1) along its circle of movement.

The pulse, if any, developed on the rotatable member 27 of switch 20 (when the wiper contacts a stationary contact) is applied to amplifier 31 by line 32. The pulse signal, if any, developed on rotating member 28 of switch 21 is applied to AND circuit 33 by line 34. The —10 kc. square wave of line 5 is also applied to AND circuit 33.

Figure 3:
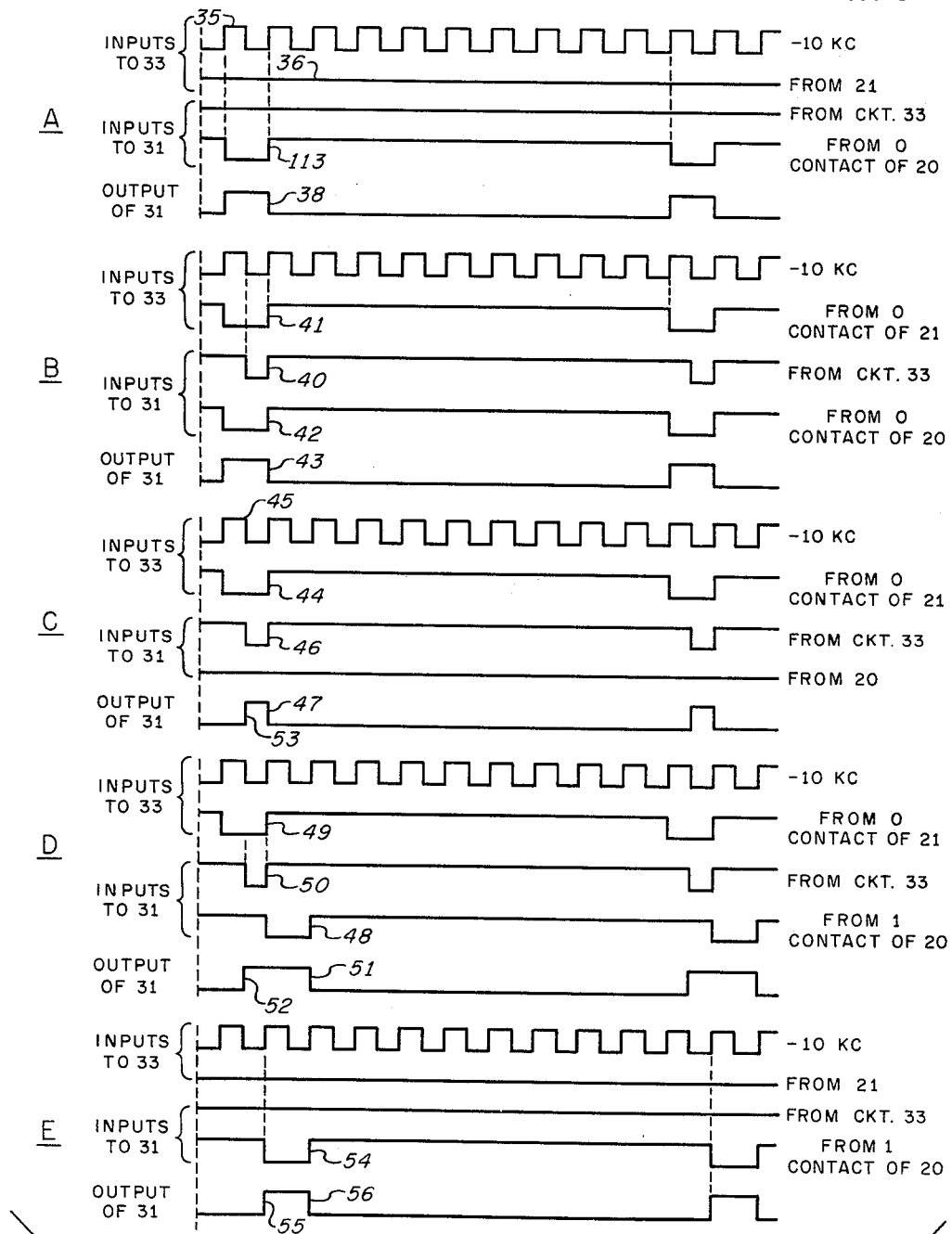
FIG. 3 is a series of idealized waveforms useful in explaining the operation of a typical logical decision circuit as the angular displacement of the associated switch is varied.

The manner in which the pulsed signals developed on members 27 and 28 are combined in the logical circuit comprising amplifier 31 and circuit 33 will be better understood by reference to the idealized waveforms of FIG. 3. It is arbitrarily assumed that members 27 and 28 initially are at such positions that the wiper of member 27 has just completed the first third of its contact period on contact 0 and the wiper of member 28 has just completed the last third of its contact period on contact 9. Consequently, circuit 33 receives the —10 kc. square wave 35 via line 5 but receives no pulsed signal via line 34 from open switch 21. The absence of a pulsed signal is represented by the horizontal line 36 in FIG. 3A. Inasmuch as circuit 33 conducts only during simultaneous negative excursions of the input signals, no output signal is produced on line 37. The sole input to amplifier 31 is the 100 microsecond pulse 113 appearing on line 32 each time that line 10 at the output of tube 8 is pulsed. Thus, the 100 microsecond pulse 38 is produced on line 39 at the output of amplifier 31. Pulse 38 is opposite in polarity to pulse 37 due to the signal inversion of amplifier 31.

The waveforms depicted in FIG. 3A persist for 25 microseconds of additional shaft rotation until the wiper of member 28 reaches contact 0 of switch 21. At this time, the wiper of member 27 is still connected to contact 0 of switch 20. This situation is depicted in the waveforms of FIG. 3B. Circuit 33 produces the negative-going 50 microsecond pulse 40 during the simultaneous negative excursions of the —10 kc. square wave and pulse 41 received from the 0 contact of switch 21. Pulse 40 is applied to amplifier 31 along with the negative-going pulse 42 from the 0 contact of switch 20 to produce the 100 microsecond pulse 43 at the output of amplifier 31. It should be noted that the 50 microsecond pulse 40 occurs during the same time as does the 100 microsecond pulse 42. Therefore, the output of amplifier 31 (pulse 43) is the same as the output pulse 38 represented in FIG. 3A.

Upon an additional 25 microseconds of shaft rotation, the wiper member 27 breaks contact with contact 0 of switch 20, removing one of the inputs to amplifier 31. This condition is reflected in the waveforms of FIG. 3C. The wiper of member 28, however, continues to touch contact 0 of switch 21 to apply pulse 44 to circuit 33 along with the −10 kc. square wave 45. Accordingly, the 50 microsecond pulse 46 is produced at the output of circuit 33 and applied to amplifier 31 to produce the pulse 47 at the output of amplifier 31. It should be observed that the leading edge of pulse 47 now is displaced 50 microseconds later than the leading edge of pulses 38 and 43 of FIGS. 3A and 3B respectively. In other words, the leading edge has been delayed by 50 microseconds in response to a 50 microsecond equivalent rotation of shaft 24.

The waveform of FIGS. 3D and 3E depicts the condition obtaining at the input and output of amplifier 31 and circuit 33 following successive additional shaft displacements of 25 microseconds each. In the case of FIG. 3D, the wiper of member 27 has begun its contacting period with contact 1 of switch 20 to produce the 100 microsecond pulse 48 at the input of amplifier 31. The wiper of member 28 still touches contact 0 of switch 21 to produce pulse 49 at the input of circuit 33. Accordingly, the 50 microsecond pulse 50 is produced at the output of circuit 33 and the 150 microsecond pulse 51 is produced at the output of amplifier 31. The leading edge 52 of pulse 51, however, has not been delayed relative to edge 53 of pulse 47 FIG. 3C.

In the next 25 microseconds of shaft rotation, the wiper of member 28 breaks with contact 0 of switch 21. The wiper of member 27 maintains contact with contact 1 of switch 20 to produce pulse 54 at the input of amplifier 31. The leading edge 55 of pulse 56 at the output of amplifier 31 now is displaced 50 microseconds from the leading edge 52 of output pulse 51 FIGURE 3D. The cycle of operation represented in FIGS. 3A–3E has now been completed and begins anew in the manner shown in response to further angular displacement of shaft 24.

Figure 4:
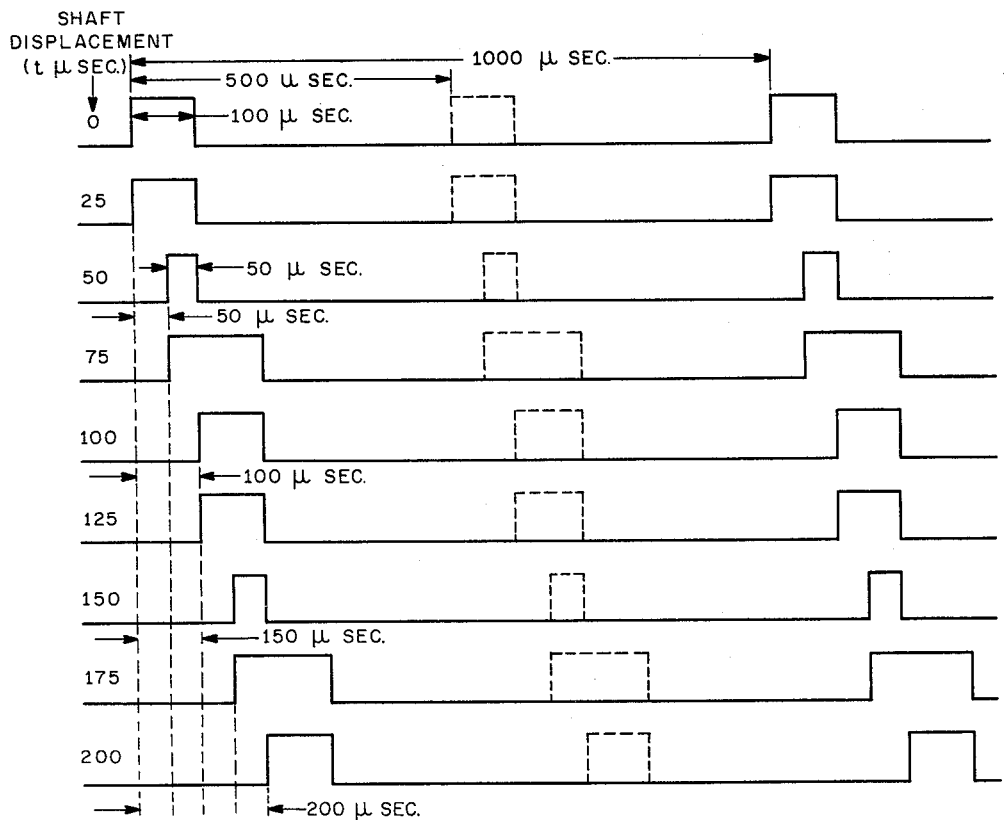
FIG. 4 is a series of idealized waveforms illustrating the output signals generated by the logical decision circuit associated with the waveforms of FIG. 3.

The idealized waveform of FIG. 4 summarize the pulsed signal conditions at the output of amplifier 31 subsequent to each 50 microsecond angular displacement of shaft 24 by control wheel 25. It will be seen that the leading edges of the output pulses are delayed 50 microseconds in response to each 50 microsecond incremental rotation of shaft 24.

Wiper members 29 and 30 of switches 22 and 23, in conjunction with amplifier 57 and AND circuit 58, operate in a manner equivalent to that described in connection with members 27 and 28 of switches 20 and 21. However, wipers 29 and 30 are angularly displaced by 180 degrees relative to members 27 and 28, respectively. Consequently, the output pulses of amplifier 57 are displaced by 500 microseconds from the output pulses of amplifier 31. The displaced outputs of amplifier 57 are represented by the dotted pulses shown in the waveforms of FIG. 4. By summing the outputs of amplifiers 31 and 57 in summing circuit 59, there is obtained a continuous series of pulses having positionable leading edges displaced from each other by the constant amount of 500 microseconds. All of the leading edges may be positioned simultaneously in 50 microsecond time increments by the rotation of handwheel 25. It should be noted that the 50 microsecond increments are precisely determined by the occurrences of the leading and trailing edges of the −10 kc. square wave derived from oscillator 1 and dividers 2 and 3.

The remaining circuit components of FIGS. 1a and 1b are used to select a particular one of the positionable output pulses of amplifier 31 in an extended time period of the order of about 100,000 microseconds. The selected pulse is produced at the output pulse of AND circuit 60. The output pulses of switches 61, 62, 63 and 64 and the associated logical decision circuits along with the output of amplifier 31 are applied to AND circuit 60. When all three of the inputs (lines 39, 65 and 66) are simultaneously negative, the selected pulse is produced at the output of circuit 60. Due to the arrangement of the switches, said selection occurs once during each time interval of 100,000 microseconds.

The wiper arms of members 67 and 68 of switches 61 and 62, respectively, are spaced one-half a switch position apart as is the case with the arms of members 27 and 28 and the arms of members 29 and 30. However, the inputs to the ten stationary contacts of switch 61 and 62 are derived from the 0–9 output terminals of the 100 cycle beam switching tube 69.

Correspondingly, the wiper arms of members 67 and 68 are each 750 microseconds (of shaft rotation) wide and 1000 microseconds apart from each other. Said arms turn in the same manner as the arms of switches 20–23 with each wiper arm "breaking" and "remaking" during the middle third of the other arm's contact period. The wiper arms are turned by shaft 70 which is driven by shaft 24 via the 10 to 1 gear train 71. The 10 to 1 gear ratio corresponds to the 10 to 1 frequency division ratio obtaining between the outputs of beam switching tubes 8 and 69. Tube 69 is stepped by driver 72 in response to successive pulses appearing at the 0 output terminal of the proceeding beam switching tube 8.

AND circuits 73 and 74 receive the outputs of the switches 61 and 62, respectively, together with two 1 kc. square waves of opposite polarity. OR circuit 75 produces one of the 1 kc. square waves whereas OR circuit 76 produces the 1 kc. square wave of opposite polarity. The square wave from OR circuit 75 is negative during the first half of each 1,000 microsecond repetition interval, whereas the square wave from OR circuit 76 is negative during the second 500 microseconds portion of said interval. This follows from the fact that one of the outputs 0–4 inclusive of tube 8 (applied to circuit 75) is negative during the first 500 microseconds whereas one of the outputs 5–9 inclusive (applied to circuit 76) is negative during the second 500 microseconds of each 1,000 microsecond repetition interval.

A 1000 microsecond negative output pulse successively appears on lines 77, 78, 79, 80, 81, 82, 83, 84, 85 and 86 in accordance with the stepping of beam switching tube 69. Thus, when the wiper arm of switch 61 is connected to one of the outputs 0–9 of tube 69, only the first 500 microseconds of the 1000 microsecond output pulse is passed by AND circuit 73. Similarly, when the wiper arm of switch 62 is connected to one of the outputs of tube 69, only the second 500 microseconds of the output pulse is passed by AND circuit 74.

Figure 5:
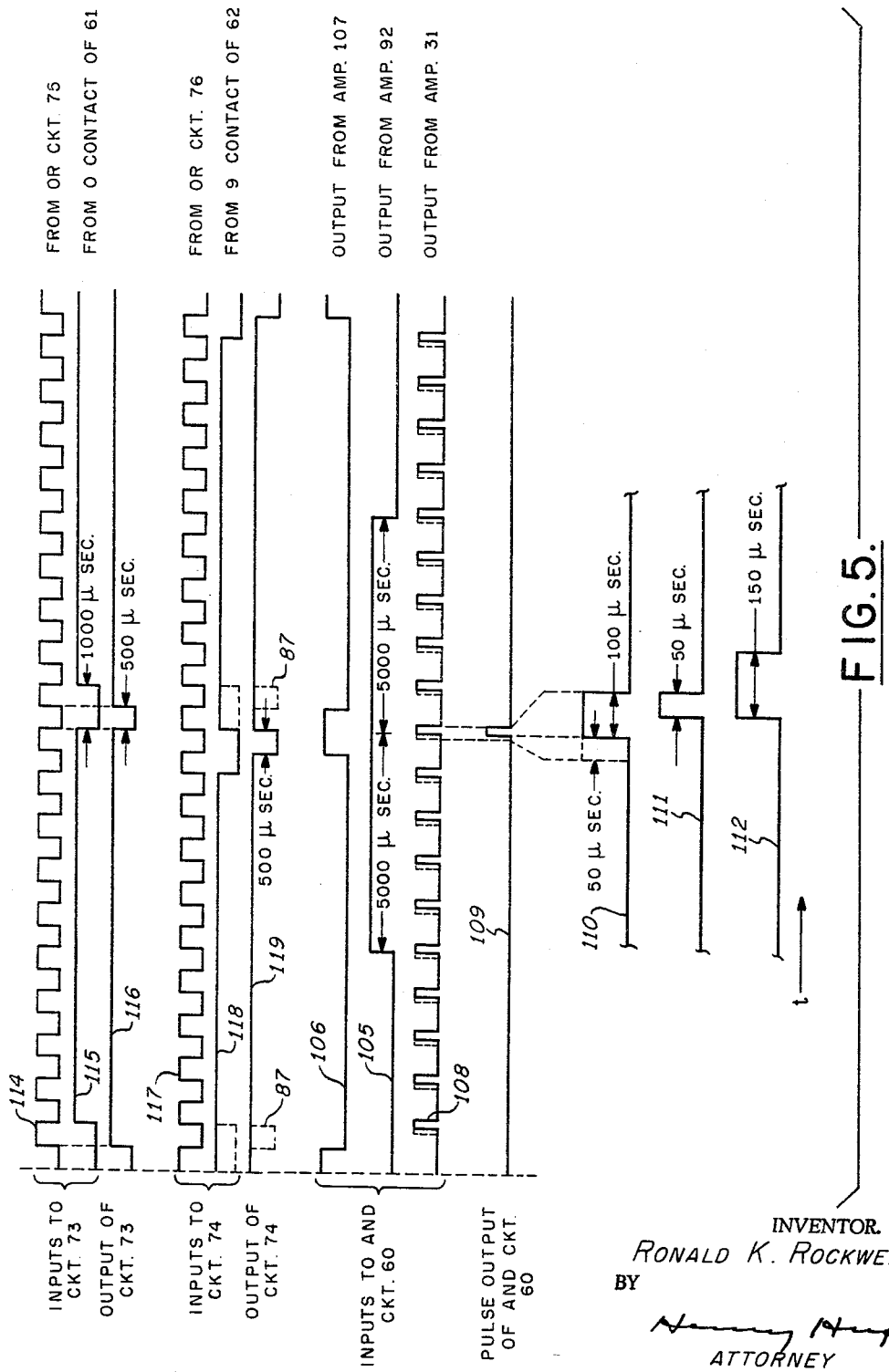
FIG. 5 is a series of idealized waveforms representing the manner in which the outputs of the individual logical circuits are combined to produce an accurately positionable single pulse within an extended time interval.

The pulses which are applied to and produced by circuits 73 and 74 are depicted in waveforms 114–119 of FIG. 5 for the switch positions shown in FIG. 1. Inasmuch as the wiper of switch 61 has just made contact with the 0 output of tube 69, shaft 24 must be turned through the rotational equivalent of 250 microseconds before the wiper arm of 62 breaks with the number 9 output of tube 69. An additional 250 microseconds (making a total displacement increment of 500 microseconds) is required before the wiper arm of switch 62 makes contact with the 0 output of tube 69 to produce the dotted output pulses 87 in waveform 119 of FIG. 5.

Switches 63 and 64, in conjunction with OR circuits 88 and 89, AND circuits 90 and 91, and amplifier 92 operate in a manner identical to that just described in connection with switches 61 and 62. OR circuits 88 and 89, however, produce 180° out-of-phase 100 c.p.s. square waves having negative excursions of 5,000 microseconds for application to AND circuits 90 and 91. Circuits 90 and 91 also receive the output pulses of beam switching tube 93 through switches 63 and 64. Tube 93, like tube 69, is driven by the 0 output of its preceding beam switching tube. The rotary members of switches 63 and 64, like members 67 and 68 of switches 61 and 62, are driven thru a 10 to 1 gear train (120) connecting with the shaft (70) associated with the preceding pair of switches. A pulse of 10,000 microseconds duration successively appears on the output lines 94–103 as tube 93 is driven by driver 104.

It will be seen that a series of 5,000 microsecond pulses (first half of the 10,000 microsecond pulse passed by switch 63 when closed) is produced by AND gate 90 and applied to amplifier 92. Similarly, a series of 5,000 microsecond pulses (second half of the 10,000 microsecond pulses derived from switch 64) is produced by AND gate 91 and applied to amplifier 92. First one, then both, then the other, and then both of AND gates 90 and 91 provide outputs to amplifier 92 as shaft 24 is rotated in a given direction. Waveform 105 of FIG. 5 depicts the output from amplifier 92 in the case where both AND circuits 90 and 91 are producing outputs. Similarly, waveform 106 represents the output from amplifier 107 when both AND circuits 73 and 74 are producing outputs.

As previously discussed, AND circuit 60 receives the output from amplifiers 31, 107 and 92. The three outputs are simultaneously positive only once during the illustrative repetition interval of 100,000 microseconds of the disclosed embodiment. Circuit 60, of course, conducts only for the duration of the shortest of the three inputs, this being the pulse 108 of FIG. 5 derived from the amplifier 31. The pulse output from circuit 60 is shown to scale in waveform 109 and in magnified time scale in waveform 110.

It will be recognized that waveform 110 is similar to pulse 38 of FIG. 3A discussed previously in connection with the operation of switches 20 and 21. As shaft 24 is displaced the equivalent of 50 microseconds from the position which produces output waveform 110, the output of amplifier 31 changes to the one represented by pulse 47 in FIG. 3C. Circuit 60, in turn, would produce the output waveform 111 of FIG. 5 because the outputs from amplifiers 107 and 92 would remain the same as waveforms 106 and 105 for such an additional 50 microseconds of shaft rotation.

More generally, the leading and trailing edges of the output pulse produced by AND circuit 60 moves along the time axis, in response to the rotation of shaft 24, in a manner somewhat similar to the movement of the extremities of an inch worm. For example, let it be assumed that an output pulse similar to pulse 51 of FIG. 3D is produced by circuit 60 at a given angular setting of shaft 24. If said shaft is rotated through an increment of 25 microseconds, the leading edge of the output waveform "jumps" 50 microseconds along the time axis to produce a pulse similar to pulse 110 of FIG. 5. It should be noted that only the leading edge has moved, the trailing edge remaining fixed in time. As shaft 24 is displaced through an additional 50 microseconds of rotation, the leading edge of the pulse from circuit 60 jumps an additional 50 microseconds to produce a pulse similar to pulse 111 of FIG. 5. Again, however, the trailing edge of the output wave form remains fixed in time. At the end of another 25 microseconds shaft displacement, the trailing edge of the output wave form jumps 100 microseconds along the time axis while the leading edge remains fixed in time to produce a pulse similar to pulse 112 of FIG. 5. The foregoing cycle of movements of the edges of the output pulse from circuit 60 repeats for addition displacements of shaft 24 whereby the leading edge thereof advances in 50 microsecond jumps in response to each full 50 microsecond shaft displacement as shown by delay indicator 26.

From the preceding specification it will be seen that the present invention produces a series of output pulses having precisely defined leading edges which are positionable in small equal time increments in response to the angular movement of a single input shaft. If desired, the output wave form may be further processed by a differentiating and clipping network to produce a single pulse coincident with the leading edges thereof. A feature of the invention is that the positionable output pulse is always produced irrespective of the particular angular setting of shaft 24 by control wheel 25. There is no setting of wheel 25 at which no output pulse is produced. The precise time delay corresponding to the time position of the output pulse (within the predetermined extended time interval) is displayed by delay indicator 26 at all times.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. A delayed pulse generator comprising
   a source of successive timing signals,
   multiple output switching means coupled to said source for sequentially energizing each output in response to said successive timing signals,
   a pair of ganged rotatable switches, each switch having multiple input contacts and a rotor contact, one input contact of each switch being connected to a respective output of said multiple output means, the rotor contacts of said switches being out of phase relative to each other by a fixed angular amount irrespective of the rotation of said rotor contacts,
   an AND circuit connected to the rotor contact of one of said switches, said AND circuit being connected to receive said timing signals,
   and summing means connected to the output of said AND circuit and the rotor contact of the other of said switches.

2. A delayed pulse generator as defined in claim 1 wherein said multiple output switching means is a beam switching tube.

3. A delayed pulse generator comprising
   a timing signal source producing, first, second and third repetitive signals, the duration of said second signal being equal to a portion of the repetition interval of said first signal and the duration of said third signal being equal to the remainder of said repetition interval,
   multiple output switching means coupled to receive said first signal for sequentially energizing each output in response to said first signal,
   a pair of ganged rotatable switches, each switch having multiple input contacts and a rotor contact, one input contact of each switch being connected to a respective output of said multiple output means, the rotor contacts of said switches being out of phase relative to each other by a fixed angular amount,
   a pair of AND circuits respectively connected to the rotor contacts of said switches, one of said AND circuits being connected to receive said second signal and the other of said AND circuits being connected to receive said third signal,
   and means for summing the outputs of said AND circuits.

4. A delayed pulse generator as defined in claim 3 wherein the durations of each of said second and third signals is one half of the repetition interval of said first signal.

5. A delayed pulse generator as defined in claim 3 wherein said multiple output switching means is a beam switching tube.

6. A delayed pulse generator comprising
   a source of successive timing signals,
   a first multiple output switching means coupled to said source for sequentially energizing each output in response to said successive timing signals,
   a first pair of ganged rotatable switches, each switch having multiple input contacts and a rotor contact, one input contact of each first pair of rotatable switches being connected to a respective output of said first multiple output means, the rotor contacts of said first pair of rotatable switches being out of phase relative to each other by a fixed angular amount, a first AND circuit connected to the rotor contact of one of said first pair of rotatable switches, said AND circuit being connected to receive said timing signals, a second multiple output switching means connected to be driven by one of the outputs of said first multiple output switching means, a first OR circuit connected to some of the outputs of said first multiple output means, a second OR circuit connected to the remainder of the outputs of said first multiple output means, a second pair of ganged rotatable switches, each switch having multiple input contacts and a rotor contact, one input contact of each second pair of rotatable switches being connected to a respective output of said second multiple output means, the rotor contacts of said second pair of rotatable switches being out of phase relative to each other by a fixed angular amount, said second rotatable switches being coupled for rotation at a fraction of the angular rate of said first rotatable switches, second and third AND circuits respectively connected to the rotor contacts of said second rotatable switches, said second AND circuit being connected to the output of one of said OR circuits, said third AND circuit being connected to the output of the other of said OR circuits, and combining means connected to the outputs of said first, second and third AND circuits and the rotor contact of the other of said first pair of rotatable switches.

7. A delayed pulse generator as defined in claim 6 wherein said first and second multiple output switching means comprise first and second beam switching tubes connected in cascade.

8. A delayed pulse generator comprising a source of successive timing signals, multiple output switching means coupled to said source for sequentially energizing each output in response to said successive timing signals, a pair of multiple contact ganged rotatable switches, one input contact of each switch being connected to a respective output of said multiple output means, each of said switches including a rotatable wiper member having an arcuate extent less than the separation between the adjacent contacts of said switches, said wiper members being out of angular alignment relative to each other by a fixed amount irrespective of the rotation of said wiper members, an AND circuit connected to the wiper of one of said switches, said AND circuit being connected to receive said timing signal, and signal combining means connected to the output of said AND circuit and to the wiper of the other of said switches.

9. A delayed pulse generator as defined in claim 8 and further including means for indicating the angular position of said wiper members.

10. A delayed pulse generator comprising a source of successive timing signals, multiple output switching means coupled to said source for sequentially energizing each output in response to said successive timing signals, a first and a second pair of ganged rotatable switches, each switch having multiple input contacts and a rotor contact, one input contact of each switch being connected to a respective output of said multiple output means, the rotor contacts of said first pair of switches being out of phase relative to each other by a first fixed angular amount, the rotor contacts of said second pair of switches being out of phase relative to each other by said first fixed angular amount, and the rotor contacts of said second pair of switches being out of angular phase with respect to the rotor contacts of said first pair of switches by a second fixed angular amount, said first and second angular amounts being fixed irrespective of the rotation of said rotor contacts, a first AND circuit connected to the rotor contact of one of said first pair of switches, a second AND circuit connected to the rotor contact of one of said second pair of switches, said first and second AND circuits being connected to receive said timing signals, and sum means connected to the outputs of said first and second AND circuits and the rotor contacts of the others of said first and second pairs of switches.

11. A delayed pulse generator as defined in claim 10 wherein said second fixed angular amount is substantially 180°.

12. A delayed pulse generator comprising a timing signal source producing first, second and third repetitive signals, the duration of said second signal being equal to a portion of the repetition interval of said first signal and the duration of said third signal being equal to the remainder of said repetition interval, a first multiple output switching means coupled to receive said first signal for sequentially energizing each output in response to said first signal, a first pair of ganged rotatable switches, each switch having multiple input contacts and a rotor contact, one input contact of each first pair of rotatable switches being connected to a respective output of said first multiple output means, the rotor contacts of said first pair of rotatable switches being out of phase relative to each other by a fixed angular amount.

first and second AND circuits respectively connected to the rotor contacts of said first rotatable switches, said first AND circuit being connected to receive said second signal and said second AND circuit being connected to receive said third signal, a second multiple output switching means connected to be driven by one of the outputs of said first multiple output switching means, a first OR circuit connected to some of the outputs of said first multiple output means, a second OR circuit connected to the remainder of the outputs of said first multiple output means, a second pair of ganged rotatable switches, each switch having multiple input contacts and a rotor contact, one input contact of each second pair of rotatable switches being connected to a respective output of said second multiple output means, the rotor contacts of said second pair of switches being out of phase relative to each other by a fixed angular amount, said second rotatable switches being coupled for rotation at a fraction of the angular rate of said first rotatable switches, third and fourth AND circuits respectively connected to the rotor contacts of said second rotatable switches, said third AND circuit being connected to the output of one of said OR circuits, said fourth AND circuit being connected to the output of the other of said OR circuits, and means for combining the outputs of said first, second, third and fourth AND circuits.

References Cited in the file of this patent
UNITED STATES PATENTS 3,089,090     Price _____ May 7, 1963